United States Patent [19]

Tominaga

[11] Patent Number: 4,677,938

[45] Date of Patent: Jul. 7, 1987

[54] GYMNASTIC DEVICE FOR SMALL PET ANIMALS

[75] Inventor: Kazutoshi Tominaga, Higashi Osakashi, Japan

[73] Assignee: Kabushiki Kaisha Tominaga Jyushi Kogyosho, Higashi Osakashi, Japan

[21] Appl. No.: 793,962

[22] Filed: Nov. 1, 1985

[51] Int. Cl.⁴ .............................................. A01K 15/02
[52] U.S. Cl. ........................................ 119/29; 119/15
[58] Field of Search ................ 119/15, 17, 29; 272/19

[56] References Cited

U.S. PATENT DOCUMENTS 3,260,236 7/1966 Jones ......................................... 119/1
3,398,719 8/1968 Walker ............................. 119/17 X
4,542,713 9/1985 Hansen .................................... 119/1

FOREIGN PATENT DOCUMENTS 2148087 5/1985 United Kingdom .................. 119/15

Primary Examiner—Robert P. Swiatek
Attorney, Agent, or Firm—Collard, Roe & Galgano

[57] ABSTRACT

A gymnastic device for use in combination with a breeding box having side walls for keeping small pet animals, such as hamsters, gerbils and mice, the device comprising a base plate having at least one aperture at one edge; and a plurality of plate members horizontally disposed on the base plate, each of the plate members being shorter in length than the side wall which it faces, the plate members being arranged on the base plate with spaces interposed between each plate member and the next, wherein each space is large enough to allow the animals to pass therethrough.

4 Claims, 6 Drawing Figures

GYMNASTIC DEVICE FOR SMALL PET ANIMALS

BACKGROUND OF THE INVENTION

1. Field of the Invention

The present invention relates to a gymnastic device for small pet animals, such as hamster, gerbils and mice. More particularly, the present invention relates to a gymnastic device for use in combination with a breeding box for keeping small pet animals. The gymnastic device enables the pet animals to enjoy their physical exercise.

2. Description of the Prior Art

It is known that small pet animals kept in a small breeding box are likely to suffer from shortage of exercise. Most of the breeding boxes are equipped with some kinds of a gymnastic device, such as a rotary wheel. The rotary wheel is of a type which is rotated by the weight of the animal itself which mounts thereon. To cause the wheel to rotate continuously, the animal must continue to exert its weight on the wheel, thereby enjoying good physical exercise.

However, the rotary wheel does not offer a pleasing view of the animals playing actively and comically, but its view are rather monotonous for the keeper (mainly children). Children like to see their pet animals moving about actively. To satisfy the children's demand a special device has been provided, which comprises transparent pipes joined one after another into a single long pipe through which the animals run to and fro. However, this requires a complicated work, and nevertheless, the total length of the pipe is limited.

OBJECTS AND SUMMARY OF THE INVENTION

The present invention aims at overcoming the difficulty of fabricating a gymnastic device for small pet animals, and has for its object to provide an improved gymnastic devie for pet animals, the device allowing the animals to move about, thereby enabling them to have an adequate amount of exercise.

Another object of the present invention is to provide an improved gynmastic device for small pet animals, the device enabling the keeper to enjoy seeing the animals moving about the breeding box.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a gymnastic device for use in combination with a breeding box for keeping small pet animals, the device comprising:

a base plate having at least one opening or aperture at one edge; and a plurality of plate members horizontally disposed on the base plate, each of the plate members being shorter in length than the side wall on which it is provided, the plate members being arranged on the basic plate with spaces interposed between each plate member and the next, wherein each space is large enough to allow the animals to pass therethrough.

DETAILED DESCRIPTION OF THE INVENTION

Figure 1:
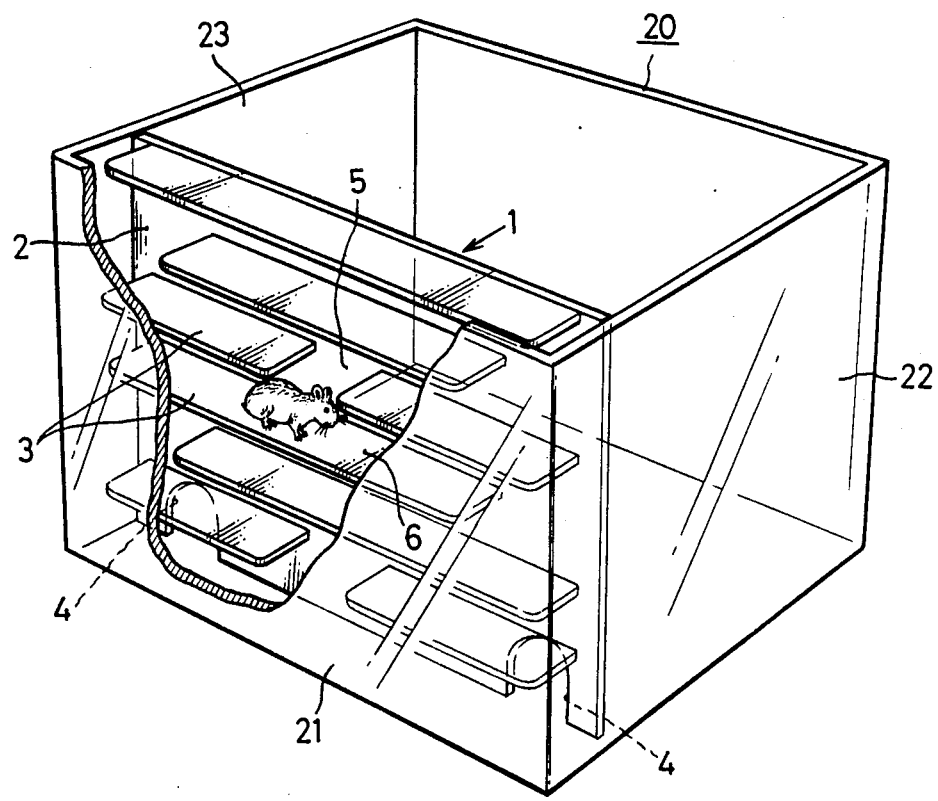
FIG. 1 is a perspective view, partially broken, showing a breeding box equipped with a gymnastic device embodying the present invention.
Figure 2:
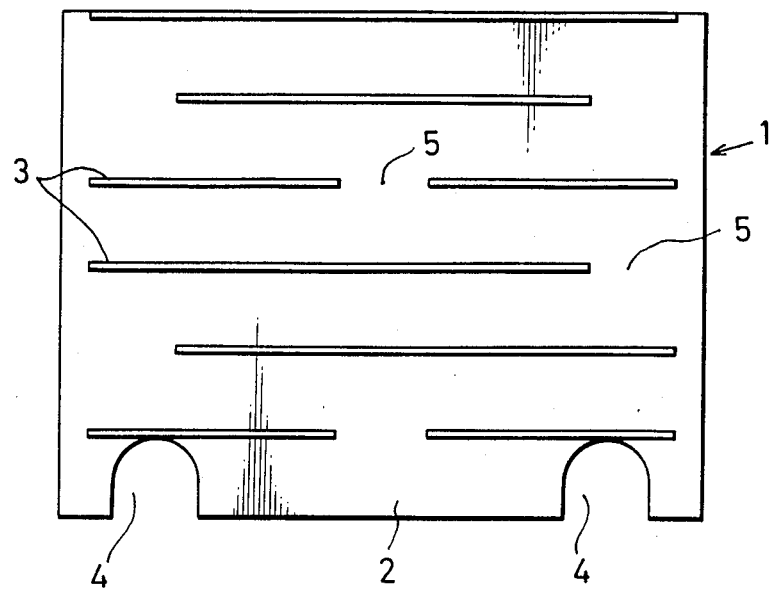
FIG. 2 is a front view showing the gymnastic device included in the breeding box of FIG. 1.
Figure 3:
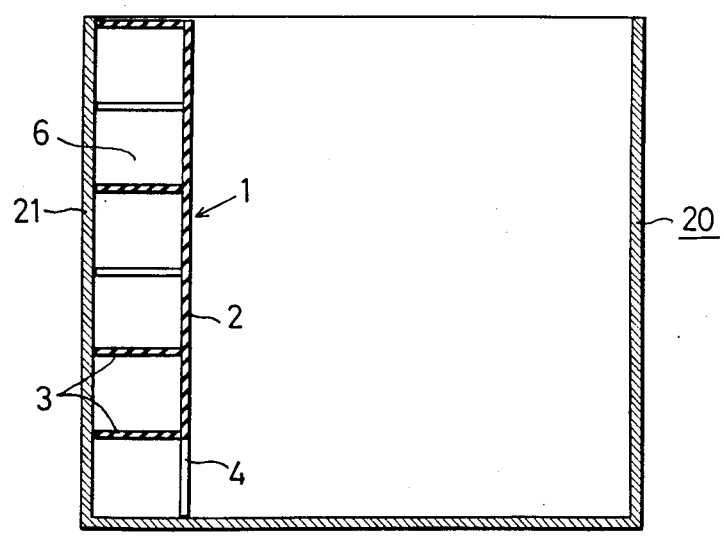
FIG. 3 is a cross-sectional side view showing the breeding box of FIG. 1.

Referring to FIGS. 1 to 4, a gymnastic device 1 includes a partition 2 inserted vertically to the bottom of a breeding box 20, and a plurality of plates 3 constituting a gymnastic path 6 allowing the animals to run thereon. The plates 3 are horizontally disposed on partition 2 in a zigzag form as clearly shown in FIG. 2. The box 20 has a viewing side 21 through which the keeper can enjoy seeing the behavior of the animals. The viewing side 21 is located opposite to the plates 3. As shown in FIG. 3, each plate 3 has an equal width to the distance between the viewing side 21 and the partition 2.

The partition 2 is provided with two openings or apertures 4 adapted to allow the animals to pass through. Without them the animals would be confined in the space between the partition 2 and the viewing side 21.

The gymnastic path 6 provided by the plates 3 is like a maze, thereby enabling the animals to fully enjoy moving to and fro. The reference numeral 5 denotes a gap between the adjacent plates 3, and between the plates 3 and the side panel of the box 1. The gaps 5 allow the animal to shift and jump from plate to plate. The positions of the gaps 5 are not limited to the illustrated ones, but can be selected as desired. If desired, a more complicated path like a maze may be fabricated. However, it is necessary not to align the gaps 5 in a vertical direction but to arrange them in a zigzag form as shown in FIG. 2. The dimensions of the box 20, the partition 2, the broken parts 4, the plates 3 and the gaps 5 are determined in accordance with the kinds and sizes of the pets kept in the box 20.

The partition 2 and the plates 3 are normally made of plastic, and can be made in one piece with the use of a mold. Of course the plates 3 can be joined to the partition 2 by means of an adhesive or any other fastener. The breeding box 20 is made of transparent plastic, thereby enabling the keeper to observe the animals therethrough.

The breeding box 20 is open-topped with a lid (not shown). The four side walls and the bottom, of which one wall is referred to as the viewing side 21, are preferably made of transparent plastic or glass. The breeding box 20 can be made of plaited wires.

Figure 4:
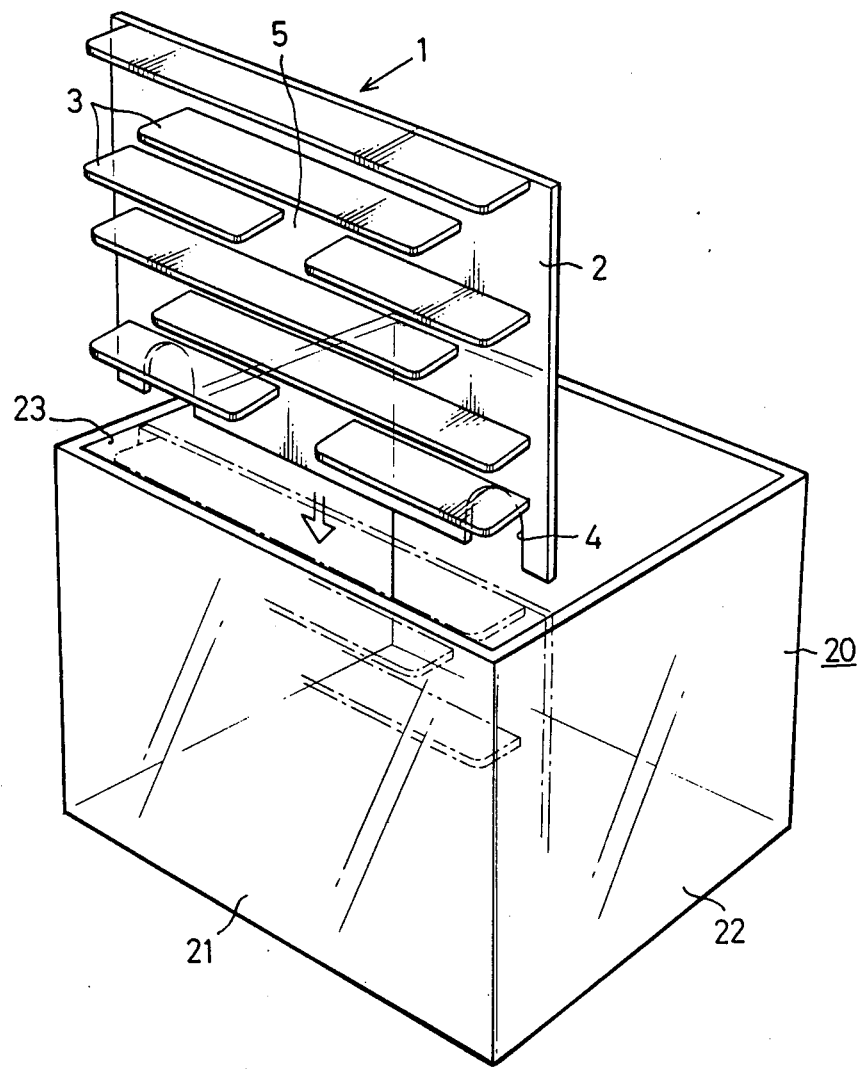
FIG. 4 is a perspective view showing the gymnastic device being fixed in the breeding box.

Referring to FIG. 4,, the fabricating of the device 1 will be described:

In the first place, the partition 2 having the plates 3 is inserted in the box 20 with the top ends of the plates 3 kept in contact with the viewing side 21, and the openings 4 downward. The partition 2 is fixed to the side walls 22 and 23. For example, an elastic member, such as rubber, is inserted between one edge of the partition 2 and one side wall 22 or 23, and between the other edge thereof and the other side wall 23 or 22. In this way the partition 2 is elastically held.

The animals enter the space in which the gymnastic device 1 is located, through the openings 4, and run about the gymnastic path 6. The keeper (mainly children) can enjoy seeing them moving about.

When the gymnastic path 6 is not needed, the partition 2 can be readily removed together with the plates 3. The number of the plates 3 can be increased or decreased as desired, thereby providing a complicated gymnastic path or a simplified path in accordance with the nature of the animals.

Figure 5:
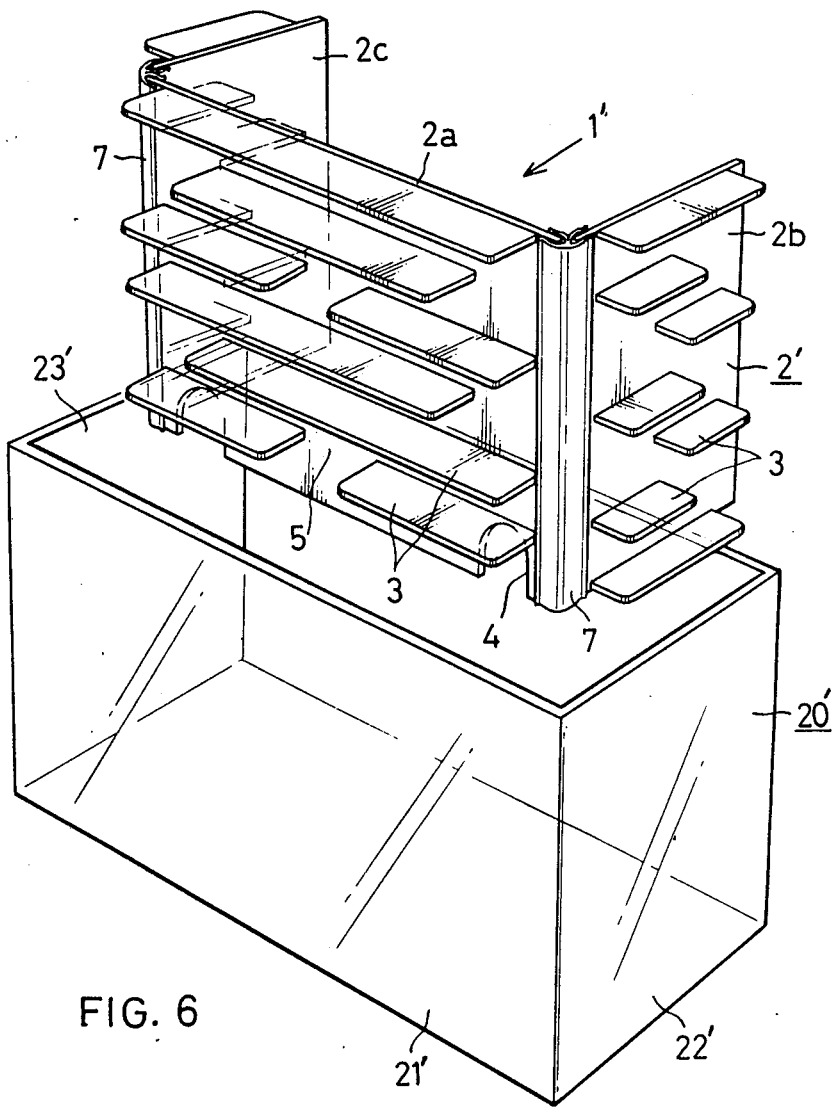
FIG. 5 is a perspective view showing a modified version of the gynmastic device of the invention.
Figure 6:
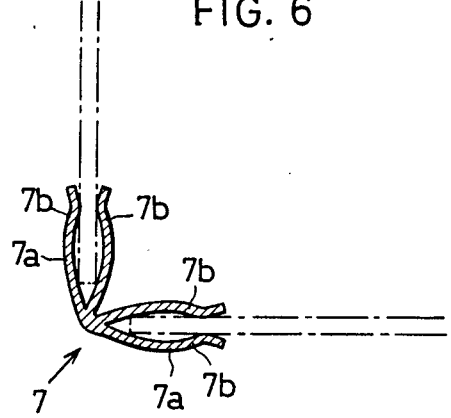
FIG. 6 is a fragmentary plan view showing an elastic joint member of panel portions of the gynmastic device of FIG. 5.

FIG. 5 shows a modified version of the embodiment, characterized by a gymnastic device 1' which comprises a partition 2' having three side walls 2a, 2b and 2c. The side walls 2a, 2b and 2c respectively, face the sides 21', 22' and 23' of the box. With the additional two side walls 2b and 2c, the gymnastic path 6 is actually prolonged, thereby resulting in a broadened gymnastic space. The reference numeral 7 denotes an elastic joint member whereby the adjacent side walls are joined in the manner shown in FIG. 6. The joint member 7 includes flap portions 7a spread at 90°, each of which has a pair of recessed portions 7b for pinching the respective side walls. In this way the side walls 2a, 2b and 2c are elastically held by the joint members 7, which are normally made in one piece of plastic. Instead of the joint member 7 a conventional hinge can be used. Alternately, the side walls 2a, 2b and 2c can be independently provided at the respective places without the use of any linking means.

The present invention is not limited to the embodiments described above, but of course it can be modified or changed within the spirit of the invention.

What is claimed is:

1. A gymnastic device for use in combination with a breeding box having side walls for keeping small pet animals, the device comprising:
    a first, a second, and a third plate associated with respective side walls of the breeding box, at least one plate having at least one opening therein along an edge, said second and third plates being arranged perpendicular to said first plate so that each of said plates is arranged to face the respective breeding box side wall; and
    a plurality of plate members associated with each of said first, second and third plates and arranged substantially horizontally thereon facing the respective breeding box side wall, each of said plate members being shorter in length than the associated breeding box side wall and arranged on each of said first, second and third plates with spaces interposed between adjacent plate members, wherein each space is large enough to allow the animals to pass therethrough.

2. A gymnastic device as defined in claim 1, wherein the first, second and third plates and the plate members are made of plastic.

3. A gymnastic device as defined in claim 1, wherein the first, second and third plates and the plate members are made of transparent material.

4. A gymnastic device as defined in claim 1, wherein the second and third plates are each connected to the first plate through an elastic coupler, the elastic coupler comprising means for pinching the first, second and third plates.

* * * * *